United States Patent
Levy et al.

(10) Patent No.: US 7,145,871 B2
(45) Date of Patent: Dec. 5, 2006

(54) AUTOMATIC ROUTER CONFIGURATION BASED ON TRAFFIC AND SERVICE LEVEL AGREEMENTS

(75) Inventors: Yonatan Aharon Levy, Manalapan, NJ (US); Eduardo Pinzon, Tinton Falls, NJ (US); Ali Mohammad Kujoory, Petaluma, CA (US); John J. Sikora, Lincroft, NJ (US)

(73) Assignee: AT&T Corp., New York, NY (US)

( * ) Notice: Subject to any disclaimer, the term of this patent is extended or adjusted under 35 U.S.C. 154(b) by 984 days.

(21) Appl. No.: 10/090,138

(22) Filed: Mar. 2, 2002

(65) Prior Publication Data
US 2003/0179703 A1 Sep. 25, 2003

(51) Int. Cl.
*H04L 12/26* (2006.01)
*H04L 12/56* (2006.01)
*G06F 15/177* (2006.01)

(52) U.S. Cl. .............. 370/229; 370/252; 370/389; 709/221; 709/242

(58) Field of Classification Search ............ 370/229, 370/232, 237, 252–254, 351, 389; 709/242, 709/220–221, 223, 238–239
See application file for complete search history.

(56) References Cited

U.S. PATENT DOCUMENTS

| | | | |
|---|---|---|---|
| 5,819,042 A | * | 10/1998 | Hansen ..................... 709/222 |
| 6,026,438 A | * | 2/2000 | Piazza et al. ............... 709/221 |
| 6,175,868 B1 | | 1/2001 | Lavian |
| 6,286,038 B1 | * | 9/2001 | Reichmeyer et al. ....... 709/220 |
| 6,349,306 B1 | * | 2/2002 | Malik et al. ............ 707/103 R |
| 2005/0120135 A1 | * | 6/2005 | Molnar et al. .............. 709/242 |

FOREIGN PATENT DOCUMENTS

| | | |
|---|---|---|
| EP | 1041794 A2 | 4/2000 |
| EP | 1021015 A2 | 7/2000 |

OTHER PUBLICATIONS

Hein, M., "Die Zukunft Gehoert Regelbasierten Netzen", Funkschau, Weka Fachzeitschriften Verlag, vol. 71, No. 22, Oct. 16, 1998, pp. 74-77.

* cited by examiner

*Primary Examiner*—Chau Nguyen
*Assistant Examiner*—Kerri M. Rose
(74) *Attorney, Agent, or Firm*—Henry T. Brendzel

(57) ABSTRACT

An arrangement where a policy manager automatically generates configuration file updates for the routers in the network, as necessary, sends those updates to the appropriate routers, and causes the routers to install the configuration file updates in real-time. The automatic generation of configuration file updates is carried out in response to information that is delivered to the policy manager from a traffic measurement and flow analysis system that replaces the prior art analyzer system. The information that is generated by the traffic measurement and flow analysis system is sensitive to thresholds that the policy manager installs in the traffic measurement and flow analysis system.

49 Claims, 4 Drawing Sheets

AUTOMATIC ROUTER CONFIGURATION BASED ON TRAFFIC AND SERVICE LEVEL AGREEMENTS

BACKGROUND OF THE INVENTION

This invention relates to packet networks and, more particularly, to performance management and control of such networks.

A packet network, like the one shown in FIG. 1, comprises routers and links that interconnect the routers. More particularly, the network comprises backbone routers such as routers 11–15, access routers such as routers 21–23, and customer routers such as routers 31–34. A backbone router is a router with all incoming and outgoing links coupling the router or to one or more other backbone routers, and perhaps to one or more access routers. Access routers, as the name implies, provide access for customer equipment to the network. The customer equipment might be a computer, a customer router, or even a network of customer routers.

The speed of the FIG. 1 network can be quite high, supporting transmission in the Gbps range; but for purposes of this disclosure one can think of network 100 as a more modest network, employing routers that are wholly electronic rather than a mixture of electronic and optical components.

The links shown in FIG. 1 are duplex links. That is, each line in FIG. 1 that connects two routers (e.g., line 101 that connects routers 12 and 13) comprises a first path that carries packets from a first router to a second router (e.g., from router 12 to router 13), and a second path that carries traffic in the opposite direction (i.e., from router 13 to router 12). A duplex link can consist of two unidirectional connections, or one bi-directional connection.

The FIG. 1 network also includes an analyzer system 110 that is coupled to the routers, an administration controller 120 that is connected analyzer 110, and an administrator terminal 130 that is connected to controller 120. System 110 receives traffic information from the routers, reduces the data through analysis to create summary information, and sends the summary information to controller 120. From this summary information, controller 120 determines whether there are congestion spots within network 100. Controller 120 also maintains a database of the service-level agreements (SLA) that the provider of network 100 has with various customers of the network and, based on the SLA information and the summary information, controller 120 determines whether the service requirements of customers are met. When it is found that the network is congested, or when it is determined that the service agreements are not met, information is communicated to a network administrator at terminal 130. In response, the administrator manually fashions a modified configuration file for one or more of the routers, and downloads the modified configuration files.

The deficiencies of this approach are that it is slow, error prone, and requires knowledge and expertise on the part of the administrator at terminal 130 that only few people posses. It is desirable to automate the task of modifying the configuration files of routers.

SUMMARY OF THE INVENTION

An advance in the art is realized, and the above deficiencies are overcome with an arrangement where a policy manager, which replaces the prior art administration controller, automatically generates configuration file updates for the routers in the network, as necessary, sends those updates to the appropriate routers, and causes the routers to install the configuration file updates in real-time. The automatic generation of configuration file updates is carried out in response to information that is delivered to the policy manager from a traffic measurement and flow analysis system that replaces the prior art analyzer system. The information that is generated by the traffic measurement and flow analysis system is sensitive to thresholds that the policy manager installs in the traffic measurement and flow analysis system.

DETAILED DESCRIPTION

As mission-critical enterprise applications of packet network customers increasingly demand high bandwidth and low end-to-end delay, it becomes more and more desirable to set router configuration parameters automatically in order to provide specified Quality of Service (QoS) levels for the network, with focus on specific customers requirements.

Figure 1:
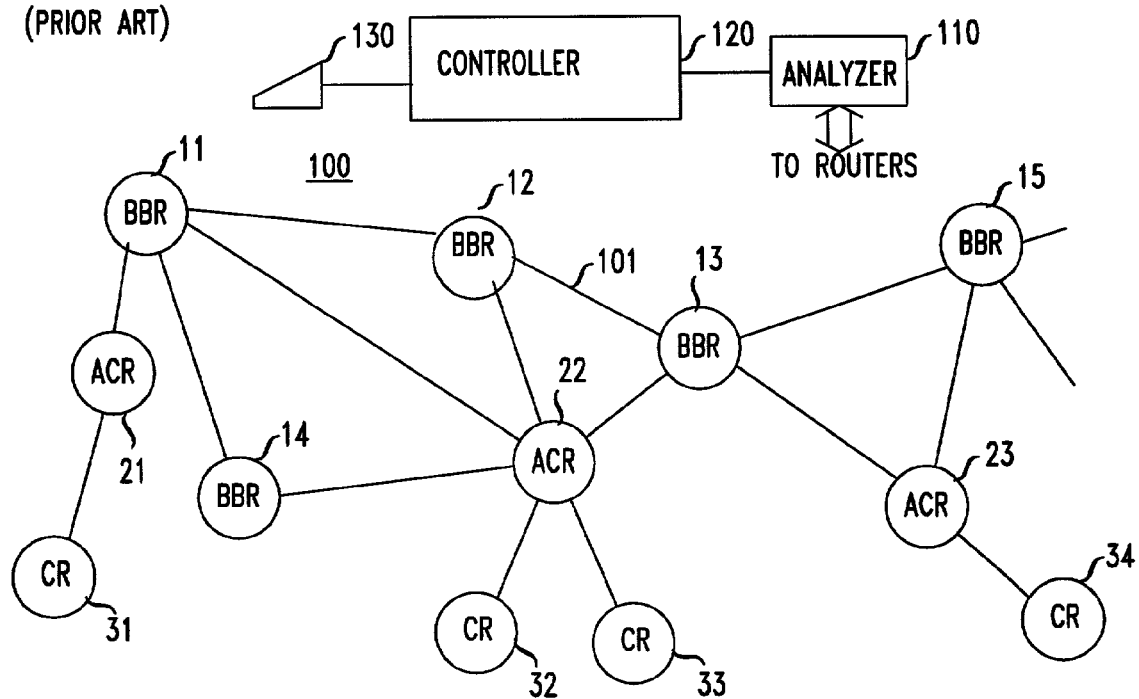
FIG. 1 presents a prior art network.
Figure 2:
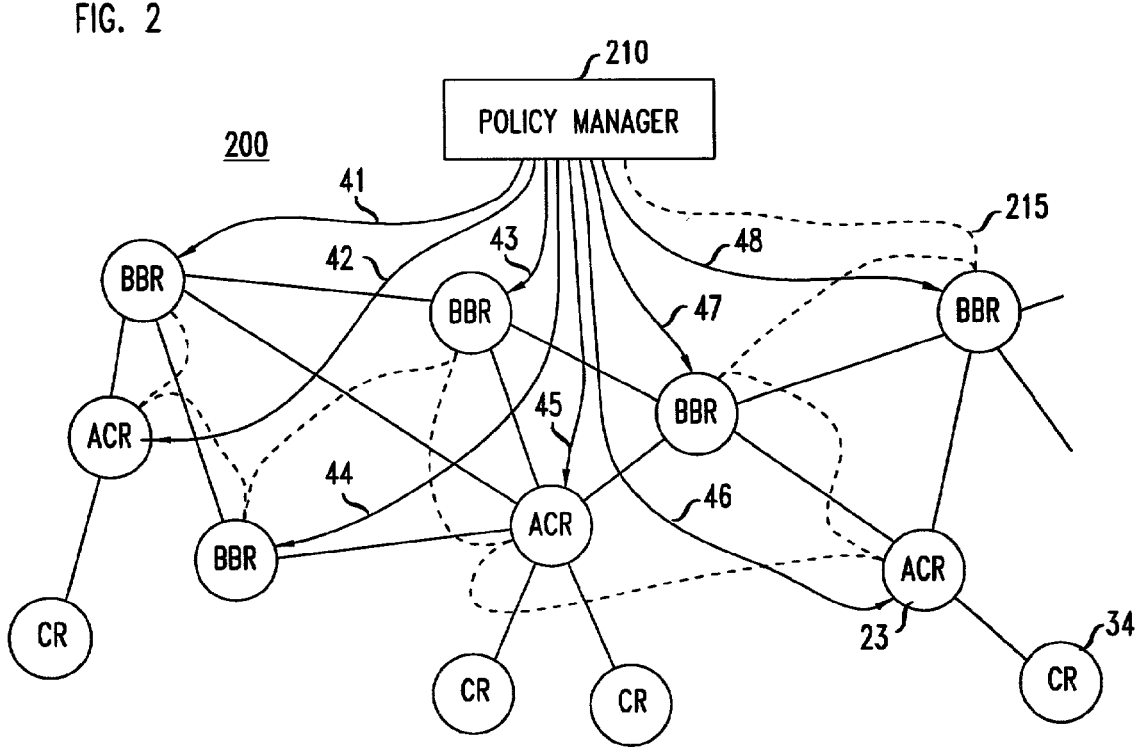
FIG. 2 shows a network akin to the FIG. 1 network that employs the principles of this invention.

FIG. 2 presents an IP network 200 that, for illustrative purposes, has the same router topology as that of the prior art FIG. 1 network. For sake of clarity, the labels of some of the elements in FIG. 2 are not shown because they are the same as the labels of the corresponding elements in FIG. 1. Network 200 differs from network 100 in that policy manager 210, which roughly encompasses the functions of controller 120 and analyzer 110, is functionally different. Also, the routers of network 200 have a different functionality from the routers of network 100. While network 200 is likely to have an administrator terminal connected to policy manager 220 (as in FIG. 1), it is not necessary for this invention and, therefore, for sake of simplicity it is not shown in FIG. 2.

The Packets

Like network 100, network 200 is in the business of carrying packets between terminal points at the edges of the network. Each such terminal point has an IP address, and packets that originate at a source IP address are sent to a destination IP address. The header of each packet, correspondingly, contains a "source IP address" field, a "destination IP address" field, a "source port number," and a "destination port number." If one is to be able to make determinations relative to service that customers receive by network 200, as is the intent of this invention, it appears also necessary to include a "customer ID" field in each packet's header. In embodiments where that is not possible, however, one can employ the source IP address of the packets instead. For example, a company X customer may own customer router 31, and employees of company X may have IP addresses with fields 123.001, 123.002, 123.003, etc. The field 123, which identifies router 31, also effectively identifies the customer. In applications where an individual is connected to network 200 through an ISP but, nevertheless, has a specified IP address, such as 245.102.34.123, that address identifies the customer.

The traffic of packets can correspond to a single stream of packets that relate to a specific application, or to a confluence of packet streams, where each stream may relate to a different application and is typically addressed to different destination IP addresses.

Correspondingly at a destination, it is possible for a particular destination to receive packet traffic that is a confluence of numerous packet streams. It is convenient, therefore, for equipment at a destination IP address to segregate received packet streams by application number, and to route each packet stream that relates to a particular application number to the appropriate application within the equipment. For example, a computer might be receiving a stream of packets to update a web page and, concurrently receive a stream of packets relating to email. To that end, packets in network 200 have an "application number" field included in each packet header. This "application field" actually designates an application type to which the packet belongs. For example, the field may specify that the packet stream belongs to an email message, to a text file, to a voice-connection, etc.

In addition to an "application number" field, each packet includes a "type of service" (TOS) field, which is a service class designation. The service class designation carries with it a set of specified parameters, such as priority, bandwidth, maximum packet limit, and queue limit. That is, packets belonging to a class are subject to these parameters, such as bandwidth and queue limits. A class assignment is controlled by, and within, network 200. More specifically, each packet that arrives at an access router of network 200 (e.g., router 22) has a value assigned to its TOS field, and routers within the network have the ability to operate based on the TOS field value, and to even modify this value.

In order to measure delays in the network, each packet includes at least one "time-stamp" field, which is set to a clock time at least by the first (access) router that a packet encounters as it enters network 200. For purposes of this disclosure, it is assumed that packets have only one time-stamp field and, of course, include various additional fields, such as a packet sequence number; but those fields are not material to this disclosure.

The Routers

Figure 3:
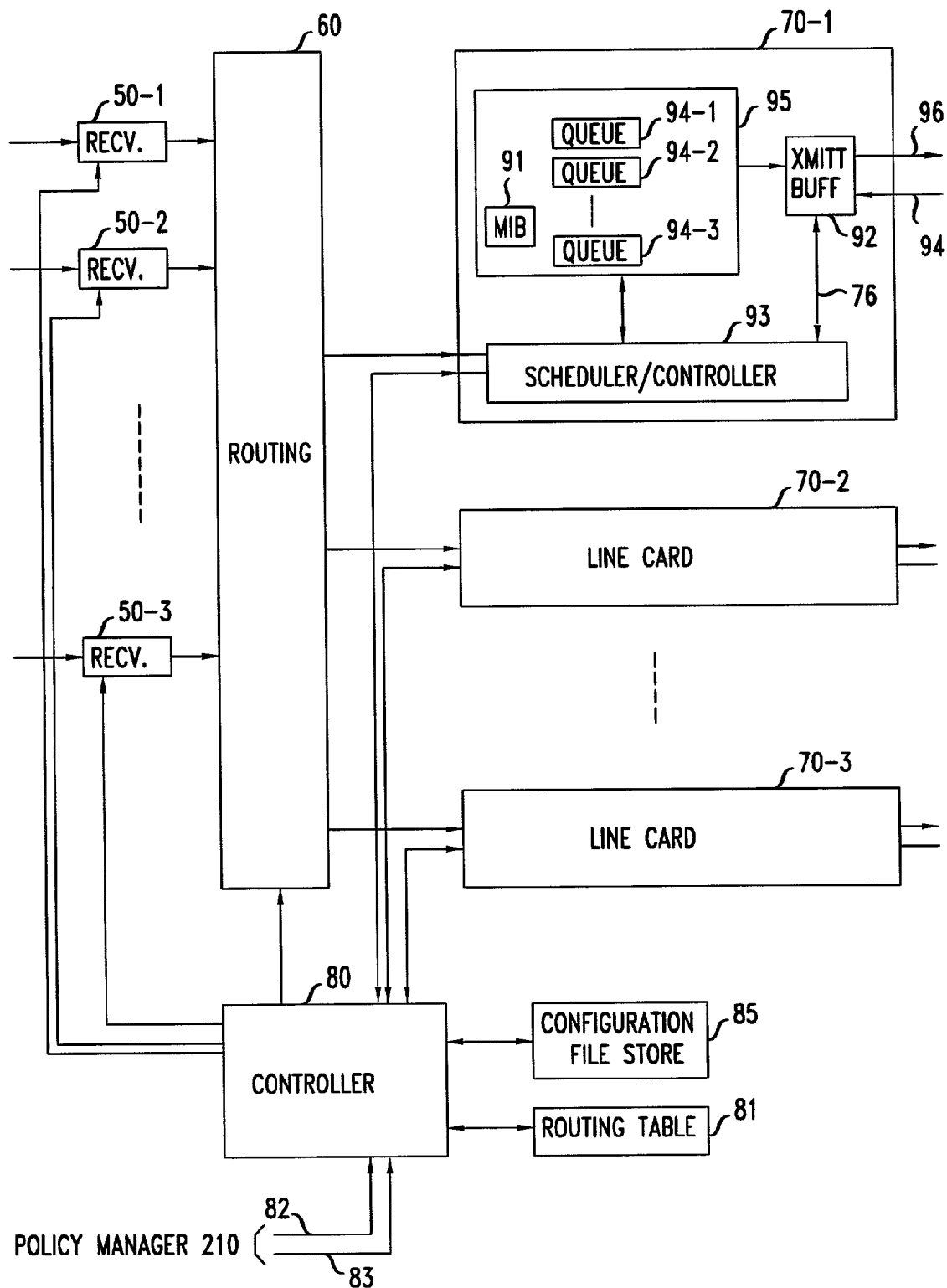
FIG. 3 is a block diagram of a router in the FIG. 2 network.

FIG. 3 presents a general block diagram of a network 200 router. It includes a routing element 60, receiving elements 50-1, 50-2, . . . , 50-3 that are interposed between input ports of the router and routing element 60, and line cards 70-1, 70-2, . . . , 70-3 that are interposed between routing element 60 and output ports of the router. Additionally, the FIG. 3 router includes a controller 80 that is coupled to receiving elements 50-i, to routing element 60, to line cards 70-i, to routing table 81 and to configuration file store (storage) 85. Controller 80 operates pursuant to a configuration file that, effectively, is the stored-program-control that imparts the desired functionality to controller 80. The configuration file for controller 80 is received from policy manager 210 via path 83, and may be kept within controller 80 or in configuration file store 85. So are the receiving elements and the line cards.

Downloading a configuration file that controls the functionality of controller 80 is a very versatile approach, because it permits to remotely modify not only the parameters of algorithms within the controller, but also the algorithms proper.

Receiving elements 50-i provide a FIFO queue, and a means for controlling information in packets before applying the packets to routing element 60. That includes altering the value of the TOS field of packets, setting a time-stamp field of packets, etc.

In accordance with one aspect of the principles disclosed herein, the TOS value of packets is set by network 200 based on the application number of the packets, but that setting is not necessarily fixed. Packets of a particular application number can be set to have a particular TOS field value at one time, and a different TOS field value at another time. Also in accordance with the principles disclosed herein, such setting can be customer-specific. That is, packets of a particular application number of a particular customer can be set to a different TOS field value from the TOS field value of the same application number but of other customers. Further, the TOS value that is imposed on packets of a given application of a given customer as those packets enter network 200 need not be maintained throughout network 200. Somewhere along some routes within network 200, the TOS value for these packets can be modified. In short, control of the TOS value in elements 50-i is one mechanism in network 200 for insuring that the network operates at a desired QoS level and also meets all of the SLA requirements.

The FIFO queue within elements 50-i provides a small averaging window for purposes of bandwidth management at the input ports of the access routers, which connect to customers, or to customer routers. These FIFO queues provide a convenient mechanism through which the access router can throttle the rate at which packets are accepted from a customer, yet permit short high-bandwidth bursts of packets. The size of the buffers that hold the FIFO queue determines the time window within which the router effectively averages the input rate at which packets are accepted. When a packet arrives at a router input port but the FIFO buffer in the associated receiving element 50-i is full, the packet is rejected (i.e., dropped), and receiving element 50-i provides an alarm message to controller 80 about the rejected packet. The message includes the customer ID, and the application number of the packet stream to which the dropped packet belongs. In short, elements 50-i form a bandwidth control mechanism, and it is one additional tool for insuring that the network operates at a desired QoS level and also meets all of the SLA requirements.

It may be noted that the FIFO queues in elements 50-i also serve another function: that of accommodating timing differences between the incoming packets and the controller 80 clock that runs the entire router. In connection with input ports where throttling is not necessary, such as between two backbone routers, the sizes of the buffers in the corresponding receiving elements 50-i can be very small, and the buffers can be removed entirely (e.g., set the queue length to zero) in applications where there is no need to accommodate clocking differences.

Physically, the memory within which the FIFO queues of elements 50-i are stored may be a common memory that is associated with controller 80, which may also be the memory that controller 80 employs in the course of its operations, the memory that maintains configuration file store 80, and the memory that holds routing table 81. In such an embodiment, controller 80 can easily control the sizes of the FIFO queues of the elements 50-i buffers pursuant to parameters contained in a configuration file that is associated with each input port of the router and stored in configuration file store 85.

Packets that exit elements 50-i and are presented to input terminals of routing element 60 are also directed to controller 80, from whence controller 80 determines the destination IP addresses of the packets. Pursuant to information from routing table 81, controller 80 directs routing element 60 to transfer the packets at its input terminals to appropriate ones of its output terminals and, through the associated line cards, to output ports of the router. By routing the packets from one router to the next within network 200, the packets traverse a path from the source IP to the destination IP via a set of links that is directly controlled by the routing tables in the various routers. As indicated above, the operation of receiving elements 50 is controlled by a configuration file that is associated with each of the receiving elements.

Line card 70-1, which is identical in construction to all other line cards 70-i (such as 70-2 and 70-3), includes scheduler/controller 93, associated memory 95 that contains a plurality of queues 94-1, 94-2,... 94-3, and transmit buffer 92. Scheduler/controller 93 receives packets from routing element 60 and delivers those packets either to memory 95, or to transmit buffer 92. More specifically, controller 93 directs an incoming packet to transmit buffer 92 if and only if (a) the transmit buffer has available space, and (b) all of the queues in memory 95 are empty. Otherwise, controller 93 directs the delivery of the incoming packet to memory 95, and the controller specifies the particular queue 94-j that should receive the packet.

Scheduler/controller 93 operates pursuant to algorithms and parameters that are specified in a configuration file that controller 93 receives from configuration file store 85. That configuration file is a file that was previously received by controller 80 from policy manager 210, via line 83, and stored in configuration file store 85. Pursuant to this configuration file, when controller 93 needs to route a received packet to memory 95, the controller detects information contained in specified header fields of the packet, such as the TOS field and, based on that information, applies the packet to the tail end of an appropriate one of the FIFO queues in sub-buffers 94-j.

Concurrently with the process of storing received packets, line card 70-1 is engaged in a process of transmitting packets. In particular, the line card releases packets onto line 96 from the head end of a FIFO queue in transmit buffer 92 (if there is a packet in buffer 92) under control of signaling line 94 from network 200, in accordance with whatever protocol is established between routers. Concurrently with the release of a packet onto line 96, the header of the released packet is provided to controller 93 for analysis (via line 76).

When a packet is released by transmit buffer 92, space is created in the buffer, and that space can be populated with another packet. When that occurs, scheduler/controller 93 causes memory 95 to output a packet from one of queues 94-j, if a packet exits in memory 95. If there are no packets in memory 95, i.e., none of the queues 94-j have a packets, queues 94-j are said to be in an underflow condition, and space remains unpopulated in transmit buffer 92. Should it occur that transmit buffer 92 empties completely, an underflow condition is said to exist in the transmit buffer. That is not an unexpected condition, of course. Indeed, it is expected that all line cards will fairly regularly have periods when there are no packets to transmit.

Correspondingly, when controller 93 determines that a packet needs to be inserted into a particular queue 94-j, for example queue 94-2, and that queue is full, an overflow condition is said to exist, and the packet is either discarded, or placed in another queue, depending on the algorithm specified for that line card by its configuration file. That, of course, is typically not desirable.

On first blush, one might believe that overflow conditions can be prevented simply by providing a large-enough buffer for each of the queues that would accommodate whatever buffering might be necessary, as long as there is no overflow condition when engaged over a long enough time window. On reconsideration, however, one may realize that it is sometimes better to drop a packet rather than to delay it beyond some predetermined interval. Examples of the preference to drop a packet (rather than to incur unduly long delay) may be found in real-time applications, such as transmission of voice signals. It is much preferable to occasionally drop a packet than to delay packets of such applications beyond a certain time interval. It is noted that, additionally, delaying packets beyond a certain interval may run afoul of an SLA parameter in policy manager 210. For these reasons, the configuration file specifies the sizes of queues 94-j (sometimes referred to as "queue limits").

While queues 94-j are shown as individual elements within memory 95, it should be understood that a single shared queue might be employed, with scheduler/controller 93 placing incoming packets at computed locations within the queue (rather than at the tail end of a selected queue).

As indicated above, each line card maintains a configuration file that specifies the algorithms employed by the line card, and includes various associated parameters, such as queue sizes. The configuration file is stored in memory 95. Additionally, memory 95 contains a MIB (Management Information Base) table 91, which holds all information related to parameters of the line card (from the configuration file), performance monitoring results, and results of analyses performed by scheduler/controller 93.

In addition to the configuration file of the line cards, configuration file store 85 maintains a configuration file for controlling the operability of controller 80, and configuration files for controlling the operability of elements 50-i. Based on the above, it may be appreciated that the configuration files obtained from policy manager 210 and line 83 completely control the routers of network 200.

In connection with the aforementioned scheduling algorithm that is stored in the configuration file of scheduler/controller 93 by which selections are made of the specific queue 94-j that is chosen to provide a packet to transmit buffer 92, there are numerous known algorithms that can be employed to make the selection. To give just a glimpse into the kinds of algorithms that are possible, an algorithm can be used that always selects a packet from the highest priority non-empty queue. Another algorithm might modulate this approach with selecting packets from lower priority queues at some regular intervals even when higher priority packets are queued up. Still another algorithm might employ a probabilistic approach for selecting a queue, where higher priority packets have a higher probability of being selected. Many of these algorithms employ parameters that have an effect on the algorithms' performance (for example, controlling the different probabilities that are chosen for each of the priority levels). Control of the algorithm type, or control of a given algorithm's parameters, provides one additional mechanism for controlling the operation of network 200.

In addition to routing of packets, an important function of the FIG. 3 router is to monitor its operation and the handling of packet flow through it. The description above already disclosed the capability of the FIG. 3 router to monitor its own operation relative to conditions that result in packet loss at elements 50-i and at queues 94-j. This monitoring function is controlled by policy manager 210 through the configuration files that it sends to routers, because it is the configuration files within the routers that specify not only the router's operation but also the conditions that are monitored, the analyses that scheduler controller 93 performs, and what conditions constitute triggers for exception reports that are to be sent to controller 80 and, then, to policy manager 210.

The following are a few illustrative examples:

Scheduler/controller 93 may maintain information in MIB 91 counts of packets and bytes processed. Separate counts may be kept by source IP address, the customer, the destination IP address, the TOS field value, the application type, etc.

Scheduler/controller 93 may maintain information in MIB 91 on the number of packets dropped per group of packets transmitted (e.g., per thousand). In addition, Scheduler/controller 93 may maintain information in MIB 91 on each packet that is dropped, including the packet's source IP address, the customer, the destination IP address, the time stamp value, the TOS field value, the application type, etc.

Scheduler/controller 93 may maintain information on packet delay through the router (e.g., delays of all packets, average packet delay, maximum packet delay, etc.). Packet delay evaluations are accomplished, illustratively, with the aid of the time-stamp field within each packet. Specifically, each packet that arrives at an input port of the FIG. 3 router has its time-stamp field set (in the receiving element 50-i at which the packet arrives) to an internal clock of the router. Thereafter, while scheduler/controller 93 gains access to each packet header as the packet is transmitted on line 95 (via line 76), it compares the time in the time-stamp field of the packet to the current value of the router's internal clock, and thereby determines the delay that the packet experienced in passing through the router.

It is noted that, in current technology, storing the results of each packet's delay may be too voluminous for MIB 91, but future technologies might permit it. More likely, designs with current technologies will store packet delay information in MIB 91 for specified classes, applications, or customers; or just average information for the specified classes, applications, or customers. Another option is to collect raw data for certain time interval, and then analyze to produce a set of statistical descriptors that are kept for each time interval. Alternatively, the configuration file might dictate that mostly "raw" information is to be sent to controller 80, and have controller 80 perform some of the analysis and storage of analysis results. Alternatively still, the "raw" information—or a specified sub-set thereof, as suggested above—might be communicated to policy manager 210, in a constant stream of information.

Scheduler/controller 93 may maintain information in MIB 91 on the actual lengths of the various queues 94-i. Here, too, the information of the lengths of queues can be distilled first. For example, scheduler/controller 93 may store the average queue lengths within a given time interval (e.g., since last polled), store the number of times the queue lengths reach their queue limits, and/or the number of times the queue lengths were zero, etc. Alternatively, the computations of averages may be carried out in policy manager 210.

Scheduler/controller 93 is likely to maintain information in MIB 91 regarding bandwidth utilization; i.e., what percentage of the time transmission buffer 92 is in an underflow condition, average byte count in transmission buffer 92 (in octets), etc.

In general, the conditions that are monitored in each line card, and in other elements of each router are conditions related to load variables and performance variables.

It is noted that some of the above examples represent merely a reporting function, while others involve analysis of the available data to distill from it specified data flowing out on lead 96 so as to create a less voluminous collection of performance data. How much of the analysis to perform in each line card, rather than somewhere "upstream," such as in controller 80 or in policy manager 210, is a design choice that is left to the practitioner.

All of the information obtained by controller 80 from receiving elements 50-i, routing element 60, and MIB 91 of line cards 70-i is communicated by controller 80 to policy manager 210, either through path 82, or through path 83. Path 82 is a high data rate path by which controller 80 sends a continuous stream of information to policy manager 210 for analysis; for example, packet delay information, in the form of tuples containing the fields:

application number:customer ID:delay.

Also, path 82 is used for sending exception reports to policy manager 210 of an existing or approaching particular condition. For example, a router might be set (by its configuration file) to send an exception report when a particular application is reaching an 80% bandwidth utilization at a line card of the router.

Alternatively, controller 80 may store information within a block of its memory, format it, and when the block is full, send a burst of data over path 82. Path 83 is a lower rate path by which policy manager 210 polls controller 80 and receives responsive information. Path 83 is also used to send configuration file updates to controller 80. Controller 85 installs the received configuration file in configuration file store 85, and distributes the updates from store 85 as appropriate (e.g. to the line cards). The use of paths 82 and 83 is illustrative, of course, and other approaches for communicating information between a router and policy manager 210 can be used.

Policy Manager 210

Figure 4:
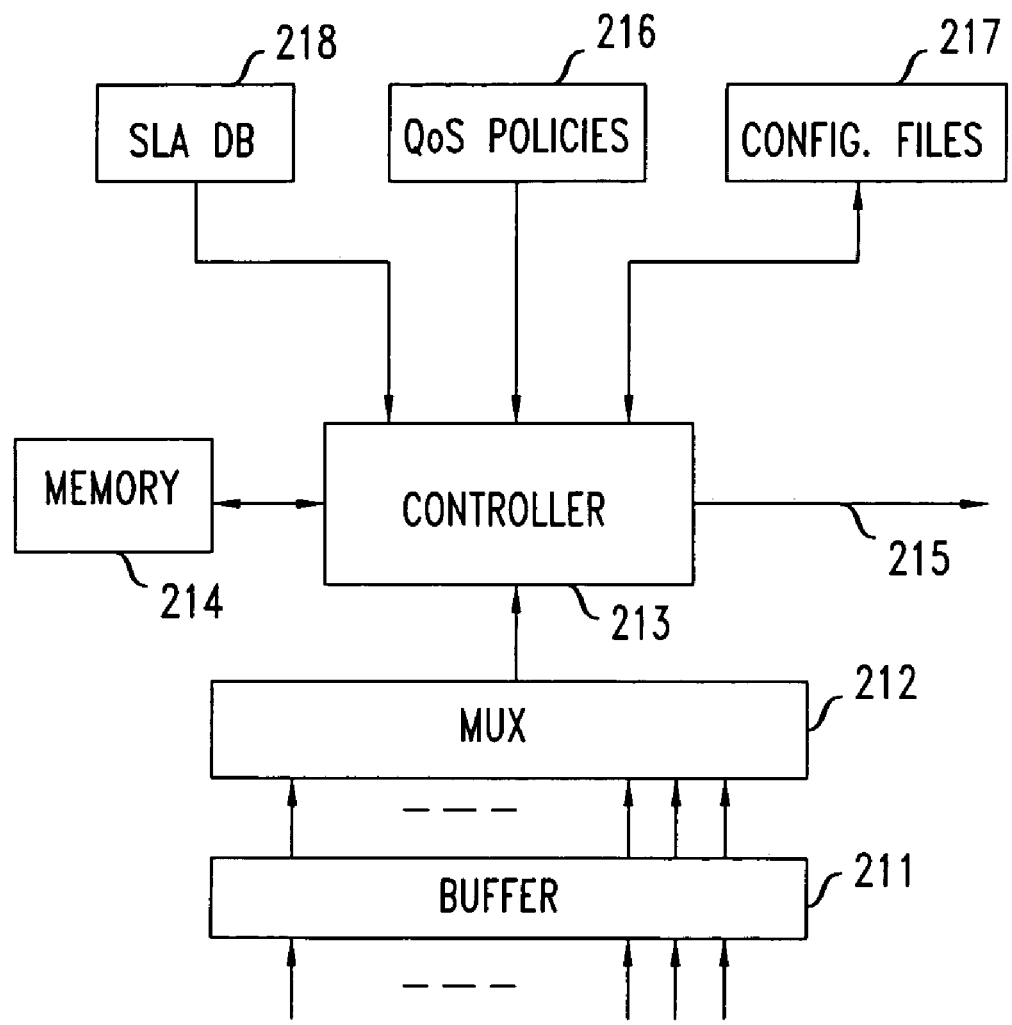
FIG. 4 is a block diagram of the policy manager in the FIG. 2 network.

FIG. 4 presents one embodiment of policy manager 210. It includes controller 213 with associated memory 214, an SLA database 218, a Quality of Service (QoS) database 216, and a database of configuration files 217. All of the databases are connected to controller 213, as is communication line 215 through which polling is conducted of the network 200 routers. Additionally, policy manager 210 includes buffer 211 that receives information that the various network routers sent over paths 41–48 (of FIG. 2), and that information is fed into controller 213 through multiplexer module 212. Of course, if a single processor cannot handle the workload required of controller 213, numerous processors can be used.

The SLAs within database 223 specify, for different customers, the levels of service that network 200 commits to provide to the customers. Each agreement can be quite detailed, specifying different service attributes that relate to the service of which the customer is assured. The following examples illustrate a number of such attributes, but it should be understood that these examples are merely illustrative and do not constitute a comprehensive list of attributes.

Guaranteed Bandwidth—This parameter specifies the maximum guaranteed rate at which a customer can present packets to network 200 without having those packets rejected simply because the rate is too high. That typically refers to an average rate, taken over a specified time window.

In some embodiments, when a network is not busy, a customer may be allowed to send packets at a higher rate than the SLA specifies, but that rate is not guaranteed. Effectively, the additional bandwidth is provided gratis.

Application-specific bandwidth—This parameter is sensitive to the proportion of the customer's bandwidth that a particular application of the customer may utilize. For example, the SLA might specify that up to 20% of the bandwidth allowed to the customer may be occupied by any one (or a specific one) of the customer's application types.

Application-specific end-to-end delay—This parameter specifies the maximum delay (between the ingress to the network and the egress from the network) to which packets of a particular application of the customer may be subjected.

Maximum rate of dropped packets—This parameter specifies the maximum number of packets that may be dropped by the network within a specified interval. This may be applicable to the entirety of a customer's traffic, or it may be sensitive to application types. For example, data communication may have a lower packet-dropping limit than voice communication.

To illustrate the relationship between the SLA requirements and the performance data that needs to be collected in order to insure that these requirements are met, it is assumed, for example, that access router 22 receives packet streams from customer A on some particular input port of the router. It is assumed further that the SLA of customer A is as follows:

| Service Level Agreement for Customer A | |
| --- | --- |
| Attribute | Commitment |
| Maximum overall bandwidth | 40 Kbytes/sec |
| Application-sensitive bandwidth | Application number "3" can use up to 10 Kbytes per second |
| Application-sensitive end-to-end delay | 100 msec |
| Application-sensitive maximum rate of dropped packets | 1 packet per 10 seconds |

To satisfy the "maximum overall bandwidth" commitments of the SLA, router 22 is programmed to devote at least 40 Kbyte-time-slots for customers A, and grant additional time slots to the customers only when traffic conditions in network 200 allow.

To satisfy the "application-sensitive bandwidth" commitment of customer A, router 22 is programmed to be sensitive to the proportion of the 40 Kbyte-type-slots that are being used up by application 3 (i.e., 25%) and to refuse to accept packets belonging to application 3 that raise the proportion relative to the total number of accepted packets above the 25%.

To satisfy the "application-sensitive end-to-end delay" commitment of customer A, network 200 needs to be able to determine—for any particular customer—the packet delay through the network for a particular customer, and to control this delay. Packet delay through network 200 is determined, in the illustrative example disclosed herein, by determining packet delays through each router on a given path, and combining the router delays to obtain the network delays. Delays through a router are determined with the aid of the time-stamp field, as disclosed above, and information about those delays is transmitted to policy manager 210. Therein, the information from all of the routers is combined to yield the network end-to-end delays. Control of this delay is effected through the configuration files of the routers. The configuration file changes that may be employed, for example, are:

changing parameters of a scheduling algorithm in particular routers, changing the TOS field value of packet streams of some application(s) (e.g. packet streams with application number "80") throughout the network changing the TOS field value of packet streams of some application(s) (e.g. packet streams with application number "80") in selected routers, or particular line card(s) of selected routers changing queue limits of module 93 sub-buffers in selected routers, or particular line card(s) of selected routers To satisfy the "application-sensitive maximum rate of dropped packets" requirement of customer A, the routers of network 200 are programmed to ascertain the percentage of packets dropped in the routers, and to send information to system 210 about those packets, perhaps in the form of the following tuple:

application number:customer ID:rate of packets dropped.

That information is combined in policy manager 210 to obtain a measure of the rate of dropped packets within the network 200 relative to specific application numbers and customers.

In addition to ascertaining whether network 200 operates in a manner that satisfies the conditions imposed on the network by virtue of the SLAs, it is desirable to have network 200 operate well based simply on a Quality-of-Service policy that the provider of network 200 chooses to set forth in database 224. Illustratively, the QoS database may specify limit values to the following attributes:

packet loss rate, average packet delay through the network, maximum packet delay through the network, and traffic load distribution on the links of the network (bandwidth utilization measure).

One can appreciate that performance data that is described above to be collected for assuring that SLA commitments are met can also provide the information necessary to determine whether QoS requirements are met. Of course, some specific information that is needed to determine whether QoS requirements are met might not be available from the information packets that actually flow through network 200. For example, perhaps no traffic happens to be flowing through output ports of access router 23. In such a case, delay between access router 21 and access router 23—if packet traffic were to be instituted between routers 21 and 23—cannot be measured simply from actual traffic flows from one customer to another customer. Accordingly, to provide data for the QoS analysis, to prospectively insure that SLA requirements are met, the configuration files of the access routers are arranged to create test packets that are cast onto the network to all output ports for which information is desired. The configuration files may inject those packets in a periodic fashion (e.g., every minute), or only when customer traffic is lacking. This active creation of test packets that are cast onto the network, which is termed herein "multi-pinging," is somewhat akin to conventional "pinging," where a computer sends a test packet to a specified destination, that destination responds, and the delay between the sending of the packet and receipt of the response is noted as the round trip delay. The multi-pinging employed herein differs from conventional pinging in that it causes the generation of numerous delay indication messages from numerous points in network 200 as well as, possibly, some alarm messages, and all those messages are sent to policy manager 210, rather than back to the source. Of course, it should be realized that the "multi-pinging packets can be also sent back to the source, where results of the multi-pinging are stored and, thereafter, communicated to the policy manager 210 with a transmission initiated by the source, or responsive to a polling.

It may be noted that the test packets can also originate under control of the customers. In such an embodiment, a customer's equipment is arranged to output test packets, for example, to a particular destination (egress port of network 200), obtain delay information (in accordance with conventional "pinging" techniques), and further arranged to send the information to policy manager 210.

The function of system 210 is to distill information from the multitude of signal streams that it receives from the routers in network 200. With respect to some of this information, system 210 is simply a "sink" for the information, in the sense that information arrives not in response to any action taken on the part of system 210. The paths for this information (from the various routers) are lines 41–48 that are shown in FIG. 2, and designated by label 82 in the router shown in FIG. 3. With respect to other information, controllers 80 of the different routers in the FIG. 2 arrangement send the information only in response to a polling signal from system 210. The path for this information is dashed line 215 in FIG. 2, which is connected to all of the network 200 routers in a "daisy chain" fashion. This is merely illustrative, of course, and other communication schemas between the routers and the policy manager 210 can be envisioned.

FIG. 4 presents a high-level block diagram of one embodiment of system 210 that provides the above-described functionality. It comprises a buffers module 211 that accepts packets arriving from the different routers, and a multiplexer module 212 that accesses the packets that are stored in the buffers module and applies them to processor 213. Memory 214 is associated with processor 213, and it stores the programs of controller 213, the algorithms and analysis parameters (thresholds) employed by processor 213, and the results developed by processor 213. Processor 213 uses path 215 to poll the routers for predetermined, or specified, information.

Basically, the function of policy manager 210 is to programmatically monitor the operation of network 200, relative to the desired QoS characteristics stored in element 216 and relative to SLA parameters stored in element 215, and to automatically modify one or more of the configuration files that are stored in one or more of the routers, as needed. The modifications are effected by downloading either the modified configuration files, or only the updates to the configurations files. Of course, the configurations files that are stored in database 217 are modified correspondingly.

Illustratively, policy manager 220 divides the information that it is concerned with into classes. The top class, e.g. class 1, is the class that gets the most attention, and the bottom class, e.g., class 9, is the class that gets the least attention. Additionally, each class comprises N applications, which are assigned to their respective classes by the policy manager. An "application," in the context used herein, is packet traffic of a particular type, such as email traffic, or real-time voice communication traffic. In accordance with the principles disclosed herein, the assignments are alterable by the policy manager. A further level of granularity can also be employed with respect to different applications of different customers. For example, the email application of one customer (for example, the municipal government) might be assigned to a higher class than the email applications of citizen Joe Q. Public. In other words, the promised performance for the applications, as reflected in the SLA's of the various customers, can dictate the class assignments.

Figure 5:
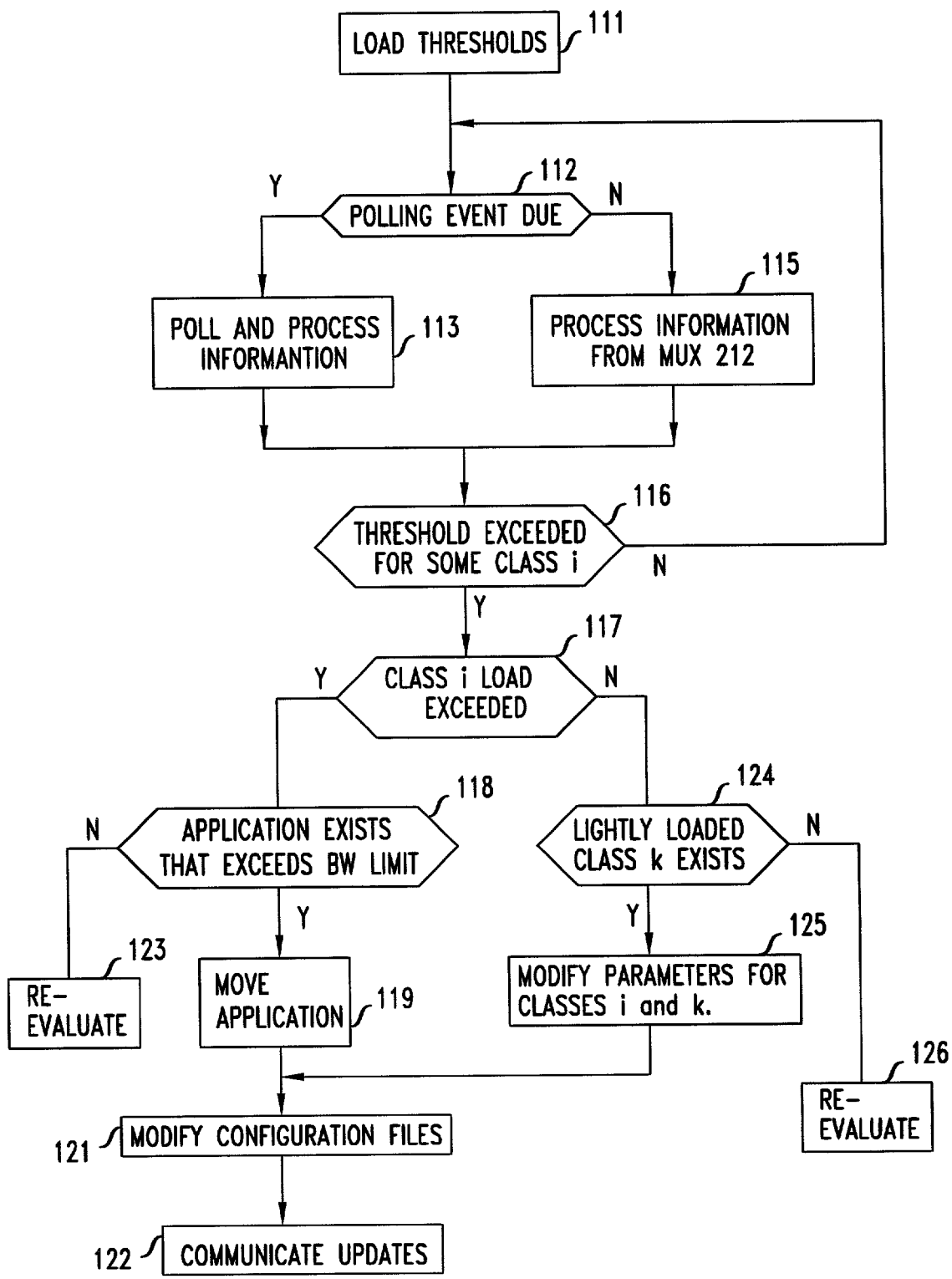
FIG. 5 is flowchart describing the general operation of the FIG. 2 policy manager.

FIG. 5 presents an illustrative block diagram of a process carried out in policy manager 210 where class performance and performance of applications are monitored The process starts with step 111 where thresholds related to information contained in elements 215 and 216 are loaded. It is against these thresholds that the information collected from the routers and analyzed by policy manager 210 is evaluated in the FIG. 5 process. More specifically, the process effectively starts at step 112, which determines whether a polling of the routers is to take place. When polling is determined to yet not be due, control passes to step 115 where information received via multiplexer 212 is analyzed. Thereafter, control passes to step 116, which determines whether any performance or load thresholds have been exceeded relative to any class of service. When the determination is that thresholds have not been exceeded, control returns to step 112. The frequency with which polling takes place is a design choice, and so is the frequency with which the FIG. 5 process takes place.

It may be noted that the notion of threshold being exceeded does not necessarily mean a single event of a threshold being exceeded. Rather, a determination that a threshold is exceeded can follow any desired algorithm. The simplest ones are (a) exceeded once, (b) exceeded more than N times within the last hour, (c) exceeded for longer than Y minutes, etc. More complex algorithms are, of course, also possible.

When step 112 determines that a polling of network 200 routers is due, control passes to step 113, which proceed to poll the routers, collect the polled information from the various MIB tables, and process this information. Thereafter, control passes to step 116, which determines whether any of the thresholds have been exceeded relative to any class of service.

When a determination is reached in step 116 that a particular class of service, for example, class i, has exceeded one or more thresholds, control passes to step 117, which determines whether it is the load parameters that have been exceeded for class i, or some other parameters. When the conclusion is that it is the load imposed by the applications in class i that is the cause for exceeding the thresholds, control passes to step 118, which determines whether an application exists in class i that exceeds its bandwidth limit. When such is the case, control passes to step 119, which moves the offending application to a different, lower, class, but at a cost of lower performance for the mover application in other categories, such as in end-to-end delay, or packet loss level.

Moving the offending application from class i requires a change in the class assignments that are made at the access routers and, accordingly, the configuration files of those routers need to be modified. This is accomplished in step 121. Once the necessary modifications are identified, control passes to step 122, which communicates the necessary updates to the appropriate routers. The communication may be in the form of new configuration files that policy manager 210 sends to the routers, or in the form of incremental changes to the existing configuration files. Illustratively, the communication of updates includes appropriate installation directions. It is noted that a class change for an application can be made to the entire network, or just to one or a few routers. The entire network is affected simply by modifying the configuration files of the network's access routers.

When step 118 cannot identify an application that takes up bandwidth in excess of its bandwidth limit, that means that either the capacity of network 200, or the guaranteed load for class i must be changed. This is reflected in the FIG. 5 process with control passing to step 123.

When step 117 determines that the exceeded thresholds for class i are not related to load parameters, control passes to step 124. Step 124 determines whether some other class exists, for example, class j, which performs well below its thresholds. When such a class is found, control passes to step 125, which modifies the operational parameters for class j to reduce the resources that are made available to class j, and correspondingly modifies the operational parameters for class i to increase the resource that are made available to class i. In this manner, performance of network 200 for class i is improved at the expense of performance for class j, which was found to be able to operate properly even with reduced resources.

Again, these changes in operational parameters for classes i and j must be reflected in the configuration files and, accordingly, control passes from step 125 to step 121 and, thence, to step 122, which are described above.

Lastly, when step 124 concludes that no class is found that is operating well within its available resource, the conclusion must be reached that either the network is operating well but that the thresholds are set too low, or that the network is in need of improvement. These alternatives are considered in step 126. It is likely that steps 123 and 126 will involve (in most embodiments) interactions with an administrator of network 200.

It should be realized that the above disclosure relative to FIG. 5 describes the basic principles of this invention, but that the analysis of an actual embodiment may be more complex, depending on the complexity of the network and the sophistication of the control that is desired. For example, customer SLAs effectively provide additional "granularity" to the considerations undertaken by policy manager 210. In addition to having classes that contain preassigned applications, it is possible to split applications so that application X of customer Y is in class A, whereas the same application X of other customers is in class B.

Moreover, the process of determining whether the SLAs of customers are met can be incorporated in the FIG. 5 process, or can be an independent, parallel, process. As with the FIG. 5 process, analysis of the network's performance relative to customer SLAs takes the form of selecting a set of thresholds based on the customers' SLA and analyzing the data received at policy manager 210 relative to each of the customers. Again, when a threshold is found to be exceeded, corrective action is taken. That corrective action might involve moving an application of that customer to a different class, or modifying the operational parameters of one or more of the routers relative to packets of that customer.

Certainly it is clear that the arrangement disclosed herein provides policy manager 210 with detailed data relative to each and every output of each and very router relative to each and every class, each and every application, and each and every customer that has an SLA with the provider of network 200. Therefore, it is possible for policy manager 210 to analyze the performance of the network down to an individual router, or to an individual link carrying packets between two routers, or a collection of links that form a path from a selected ingress point of network 200 to a selected egress point of network 200. Moreover, the arrangement disclosed herein allows policy manager 210 to control—through the configuration file—the operational behavior of each and every router, as well as control the type of information that the router feeds back to the policy manager.

The above disclosed principles of this invention with a general discussion that is not limited to specific details of a particular embodiment, and it should be realized that various additions, modifications, and detailed embodiments could be created without departing from the spirit and scope of this invention. To illustrate, policy manager 210 is shown to includes a database 217 of configuration files that embodiment of most artisan would utilize in order to construct the necessary modified configuration files, or the modifications to the configuration files. However, other artisans might choose, at time, to poll routers for the parameters that are actually in the routers, rather than rely on the representation of the values of those parameters in the configuration file within database 217.

The invention claimed is:

1. Apparatus comprising:
a first module that receives information from a plurality of routers of a network;
a second module that carries out analysis of said information relative to received thresholds that are related to stored service-level agreements;
a third module for providing to the second module said thresholds and also being responsive to analysis results of said second module that, when said analysis results indicate an unsatisfactory operational condition in said network, develops configuration-information regarding configuration files of one or more of said routers; and
a fourth module that transmits said configuration-information to said one or more of said routers to modify a configuration file within said one or more of said routers in real time that, in turn, modifies operation of said one or more of said routers.

2. The apparatus of claim 1 where said first module receives said information independently of any request for information by said first module.

3. The apparatus of claim 1 where said first module receives said information by polling said routers.

4. The apparatus of claim 1 where said first module polls said routers pursuant to an internal algorithmic process, or periodically.

5. The apparatus of claim 1 where said first module receives first type of information from said routers independently of any request for information, and receives second type of information from said routers in response to polling requests launched by said first module.

6. The apparatus of claim 5 where the first type of information includes exception reports that alert said first module of occurrence of predetermined events, and said second type of information comprises monitored values information of variables specified in said polling requests.

7. The apparatus of claim 6 where said first type of information further includes information relating to packet flow through said routers.

8. The apparatus of claim 1 where said second module, in said analysis, distills performance information from said information received from said routers, and evaluates said performance information relative to said preselected thresholds.

9. The apparatus of claim 8 wherein said analysis determines whether said performance information exceeds one or more of said thresholds.

10. The apparatus of claim 8 wherein said analysis determines whether said performance information exceeds one or more of said thresholds by more than a predetermined number of times within a selected time interval.

11. The apparatus of claim 1 where the thresholds relate to one or more from a set including load carried by said routers, classes of applications, service level agreements, applications of specific customers, and quality-of-service parameters.

12. The apparatus of claim 1 where said analysis identifies routers whose mode of operation is in need of modifying.

13. The apparatus of claim 1 further comprises a memory that stores quality-of-service parameters, service level agreements parameters, and a configuration file for each of said routers that is controlled by a configuration file.

14. The apparatus claim 13 where said thresholds are related to said quality-of-service parameters that are stored in said memory, and to said service level agreements that are stored in said memory.

15. The apparatus of claim 1 where said configuration file of one router comprises sub-configuration files.

16. The apparatus of claim 15 where said configuration file of said one router comprises one or more sub-configuration files taken from a set that includes a sub-configuration file that directs operation of a controller of said one router, sub-configuration files that control one or more lines cards of said one router, and sub-configuration files that control receiving elements of said one router.

17. The apparatus of claim 1 where said configuration-information developed by said third module for one of said routers is a modified configuration file for said one of said routers.

18. The apparatus of claim 1 where said configuration-information developed by said third module for one of said routers is a modification of said configuration file for said one of said routers.

19. The apparatus of claim 18 where said modification modifies assignments of class to applications, modifies scheduling algorithm in line cards of said one or more routers, or modifies queue limits in line cards of said one or more routers.

20. The apparatus of claim 19 where said assignments of class to applications are reflected in assignment in TOS field of packets entering said one of said routers.

21. The apparatus of claim 18 where said modification comprises instructions to replace elements in said configuration file of said one of said routers, or to modify elements in said configuration file of said one of said routers.

22. The apparatus of claim 21 where said elements of said configuration file are sub-configuration files.

23. The apparatus of claim 21 where said elements of said configuration file are parameters of sub-configuration files of said configuration file.

24. The apparatus of claim 1 where said configuration file includes a directive to install said configuration-information.

25. The apparatus of claim 24 where said directive causes installation of said configuration-information upon receipt of said configuration-information.

26. The apparatus of claim 1 where said fourth module also transmits a directive to install said configuration-information.

27. The apparatus of claim 1 where said configuration file of said one router includes one or more elements from a set comprising scheduling algorithm for outputting packets from a line card of said one router, queue sizes in a line card of said one router, transmission buffer size in said line card of said one router, processing algorithm and parameters of processing elements of input ports of said one router, TOS specifications, specification of information that said routers are to send back to said fourth module on a continuous basis, specification of information that said one router is to store in a MIB file that is accessible to said fourth module through polling, and analysis algorithms that said one router is to undertake.

28. The apparatus of said claim 1, further comprising a network comprised of said plurality of routers, with said routers being coupled to said fourth module.

29. The apparatus of claim 28 where some of said routers are access routers in said plurality of routers, and remaining ones of said routers in said plurality of routers are backbone routers.

30. The apparatus of claim 29 where said access routers include means for sending test packets through said network, resulting in end-to-end delay information being provided to said first module.

31. The apparatus of claim 1 where said modules are software modules of said apparatus.

32. A method executed by a computer comprising the steps of:

a receiving information from a plurality of routers of a network;

analyzing said information relative to preselected thresholds that relate to service level agreements;

when said step of analyzing indicates an unsatisfactory operational condition in said network, developing configuration-information regarding configuration files of one or more of said routers; and transmitting said configuration-information to said one or more of said routers to modify a configuration file within each of said one or more of said routers that, in turn, modifies operation of said one or more of said routers.

33. The method of claim 32 where said receiving of information occurs without any explicit request for information.

34. The method of claim 32 further comprising a step of polling said routers, pursuant to a algorithm executed by said computer, in response to which information arrives at said computer and is received by said step of receiving.

35. The method of claim 32 where said step of receiving receives first type of information from said routers independently of any request for information, and receives second type of information from said routers in response to polling requests launched by said computer.

36. The method of claim 35 where the first type of information includes exception reports alerting said first module of occurrence of predetermined events, and said second type of information comprises monitored values information of variables specified in said polling requests.

37. The method of claim 36 where said first type of information further includes information relating to packet flow through said routers.

38. The method of claim 32 where said step of analyzing distills performance information from said information received from said routers, and evaluates said performance information relative to said preselected thresholds.

39. The method of claim 38 said step of analyzing determines whether said performance information exceeds one or more of said thresholds more than a predetermined number of times within a selected time interval.

40. The method of claim 32 where the thresholds relate to one or more from a set including load carried by said routers, classes of applications, service level agreements, applications of specific customers, and quality-of-service parameters.

41. The method of claim 32 where step of analyzing identifies routers whose mode of operation is in need of modifying.

42. The method of claim 32 where said configuration-information developed by said step of developing is a modified configuration file one of said routers.

43. The method of claim 42 where said modified configuration file comprises one or more sub-configuration files taken from a set that includes a sub-configuration file that directs operation of a controller of said one router, sub-configuration files that control one or more lines cards of said one router, and sub-configuration files that control receiving elements of said one of said routers.

44. The method of claim 32 where said configuration-information developed by said step of developing is an update to a configuration file one of said routers.

45. The method of claim 44 where said modification modifies assignments of class to applications, modifies scheduling algorithm in line cards of said one of said routers, or queue limits in line cards of said one of said routers.

46. The method of claim 45 where said assignments of class to applications are reflected in assignment in TOS field of packets entering said one of said routers.

47. The method of claim 32 where said configuration file includes a directive to install said configuration-information.

48. The method of claim 32 where said configuration information is a configuration file that includes one or more elements from a set comprising scheduling algorithm for outputting packets from a line card of said one router, queue sizes in a line card of said one router, transmission buffer size in said line card of said one router, processing algorithm and parameters of processing elements of input ports of said one router, TOS specifications, specification of information that said routers are to send back to said fourth module on a continuous basis, specification of information that said one router is to store in a MIB file that is accessible to said computer through polling, and analysis algorithms that said one router is to undertake.

49. The method of claim 32 where the developing configuration-information regarding configuration files of one or more of said routers is carried out wholly within said computer.

* * * * *